United States Patent
Avis et al.

(10) Patent No.: US 11,883,805 B2
(45) Date of Patent: Jan. 30, 2024

(54) CATALYTIC COMPOSITION

(71) Applicant: Johnson Matthey Public Limited Company, London (GB)

(72) Inventors: Daniel Avis, Royston (GB); Yannick Bidal, Royston (GB); Alexander Nicholas Michael Green, Royston (GB); Neil Greenham, Royston (GB); Matthew Eben Harris, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 17/742,530

(22) Filed: May 12, 2022

(65) Prior Publication Data

US 2022/0362753 A1 Nov. 17, 2022

Related U.S. Application Data

(60) Provisional application No. 63/201,774, filed on May 12, 2021.

(51) Int. Cl.
*B01J 29/76* (2006.01)
*F01N 3/20* (2006.01)
(Continued)

(52) U.S. Cl.
CPC .......... *B01J 29/76* (2013.01); *F01N 3/2066* (2013.01); *B01J 29/0358* (2013.01);
(Continued)

(58) Field of Classification Search
CPC .... F01N 3/0807; F01N 3/0814; F01N 3/0828; F01N 3/0842; F01N 3/0871; F01N 3/0885; F01N 3/10; F01N 3/20; F01N 3/2006; F01N 3/206; F01N 3/2066; F01N 3/208; F01N 3/28; F01N 3/2803; F01N 2240/18; F01N 2250/12; F01N 2370/02; F01N 2370/04; F01N 2370/22; F01N 2370/24; F01N 2510/063; F01N 2550/03; F01N 2560/026; F01N 2570/14; F01N 2570/145;
(Continued)

(56) References Cited

U.S. PATENT DOCUMENTS

| | | |
|---|---|---|
| 8,535,629 B2 | 9/2013 | Ballinger |
| 8,906,329 B2 | 12/2014 | Ballinger |
| (Continued) | | |

FOREIGN PATENT DOCUMENTS

| | | |
|---|---|---|
| WO | 2012075400 | 12/2011 |
| WO | 2013079954 A1 | 6/2013 |
| (Continued) | | |

OTHER PUBLICATIONS

Liu Jinzhou et al: "Niobium modification for improving the high-temperature performance of Cu-SSZ-13 in selective catalytic reduction of NO by NH3", Journal of Solid State Chemistry, vol. 296, Apr. 1, 2021, p. 122028.

*Primary Examiner* — Binh Q Tran

(57) ABSTRACT

A catalytic composition for treating a NOx-containing exhaust gas, wherein the composition comprises a copper-substituted small-pore zeolite comprising: i) Ce and/or La in a total amount of about 5 to about 400 $g/ft^3$; and ii) Nd and/or Nb in a total amount of about 5 to about 400 $g/ft^3$.

13 Claims, 11 Drawing Sheets

(51) Int. Cl.
*F01N 3/08* (2006.01)
*F01N 3/28* (2006.01)
*B01J 29/035* (2006.01)
*B01J 29/72* (2006.01)

(52) U.S. Cl.
CPC ........ *B01J 29/7215* (2013.01); *B01J 29/7615* (2013.01); *F01N 3/0807* (2013.01); *F01N 3/0828* (2013.01); *F01N 3/0871* (2013.01); *F01N 3/206* (2013.01); *F01N 3/2803* (2013.01); *F01N 2240/18* (2013.01); *F01N 2250/12* (2013.01); *F01N 2570/14* (2013.01); *F01N 2570/145* (2013.01); *F01N 2610/02* (2013.01); *F01N 2900/1624* (2013.01)

(58) Field of Classification Search
CPC ......... F01N 2610/02; F01N 2900/1612; F01N 2900/1614; F01N 2900/1621; F01N 2900/1622; F01N 2900/1624; B01J 29/0341; B01J 29/0358; B01J 29/045; B01J 29/076; B01J 29/72; B01J 29/7207; B01J 29/7215; B01J 29/723; B01J 29/7615; B01J 29/76; B01D 53/9404; B01D 53/9409; B01D 53/9413; B01D 53/9418; B01D 53/9422; B01D 53/9427; B01D 2251/2062; B01D 2251/208; B01D 2255/2063; B01D 2255/2065; B01D 2255/2068; B01D 2255/207; B01D 2255/20761; B01D 2255/50; B01D 2255/502; B01D 2255/504; Y02A 50/20; Y02T 10/12; F02D 41/027; F02D 41/0275; F02D 41/028; F02D 41/0285; F02D 41/146; F02D 2200/0806; F02D 2200/0808; F02D 2200/0811; F02D 2200/0818

See application file for complete search history.

(56) References Cited

U.S. PATENT DOCUMENTS

| | | | |
|---|---|---|---|
| 2014/0328738 A1 | 11/2014 | Chandler et al. | |
| 2014/0336038 A1* | 11/2014 | Nazarpoor | B01J 23/83 502/65 |
| 2015/0151288 A1* | 6/2015 | Rivas-Cardona | B01J 37/10 423/213.2 |
| 2015/0352492 A1* | 12/2015 | Andersen | B01J 35/0006 502/65 |
| 2016/0279608 A1* | 9/2016 | Bisson | B01J 29/06 |
| 2018/0093256 A1* | 4/2018 | Chen | C01B 39/026 |
| 2018/0093897 A1* | 4/2018 | Chen | B01J 29/76 |
| 2018/0185788 A1* | 7/2018 | Grubert | B01J 23/83 |
| 2018/0266290 A1* | 9/2018 | Burgess | F01N 3/2828 |

FOREIGN PATENT DOCUMENTS

| | | |
|---|---|---|
| WO | 2017085646 A1 | 5/2017 |
| WO | 2021219698 A1 | 11/2021 |

* cited by examiner

CATALYTIC COMPOSITION

BACKGROUND OF THE INVENTION

The present invention relates to a catalytic composition and, in particular, to a composition for treating a NOx-containing exhaust gas. The composition gives a low temperature $NO_x$ conversion improvement without compromising the high temperature performance.

$NH_3$-SCR is the most effective technique for NOx abatement in lean-burning engine exhaust after-treatment. In this regard, Cu-SSZ-13 has been commercialized as an $NH_3$-SCR catalyst for its significant advantages of excellent catalytic performance and hydrothermal stability. However, with more and more stringent restrictions imposed on emissions from engine exhausts, especially for vehicles under cold start conditions, further enhancing the low-temperature $NH_3$-SCR activity and hydrothermal stability of SCR catalysts is highly desirable.

Small pore zeolites like CHA and AEI with low silica to alumina ratio (SAR) usually have a higher fresh activity but lower durability than high SAR framework under comparable SCR working conditions. To improve the overall performance of low SAR structures, it is necessary to enhance the durability.

Accordingly, it is desirable to provide an improved catalytic composition for treating a NOx-containing exhaust gas and/or to tackle at least some of the problems associated with the prior art or, at least, to provide a commercially viable alternative thereto.

SUMMARY OF THE INVENTION

According to some aspects of the present invention, a catalytic composition for treating a NOx-containing exhaust gas includes a copper-substituted small-pore zeolite comprising: i) Ce and/or La in a total amount of about 5 to about 400 g/ft$^3$; and ii) Nd and/or Nb in a total amount of about 5 to about 400 g/ft$^3$. In certain aspects, Ce and/or La are present in a total amount of about 50 to about 200 g/ft$^3$. In some aspects, Nd and/or Nb are present in a total amount of from about 50 to about 200 g/ft$^3$.

In some aspects, copper is present in an amount of from about 1 to about 6 wt %; about 3 to about 5.5 wt %; or about 4 wt %.

In some aspects, the small-pore zeolite has a CHA or AEI framework structure type. The zeolite may have a SAR of less than 30; about 5 to about 30; or about 10 to about 30.

In particular aspects, the catalytic composition includes: copper in an amount of from about 1 to about 6 wt % of the catalytic composition; Ce and/or La in a total amount of about 5 to about 400 g/ft$^3$; and Nd and/or Nb in a total amount of about 5 to about 400 g/ft$^3$.

DETAILED DESCRIPTION OF THE INVENTION

Figure 1:
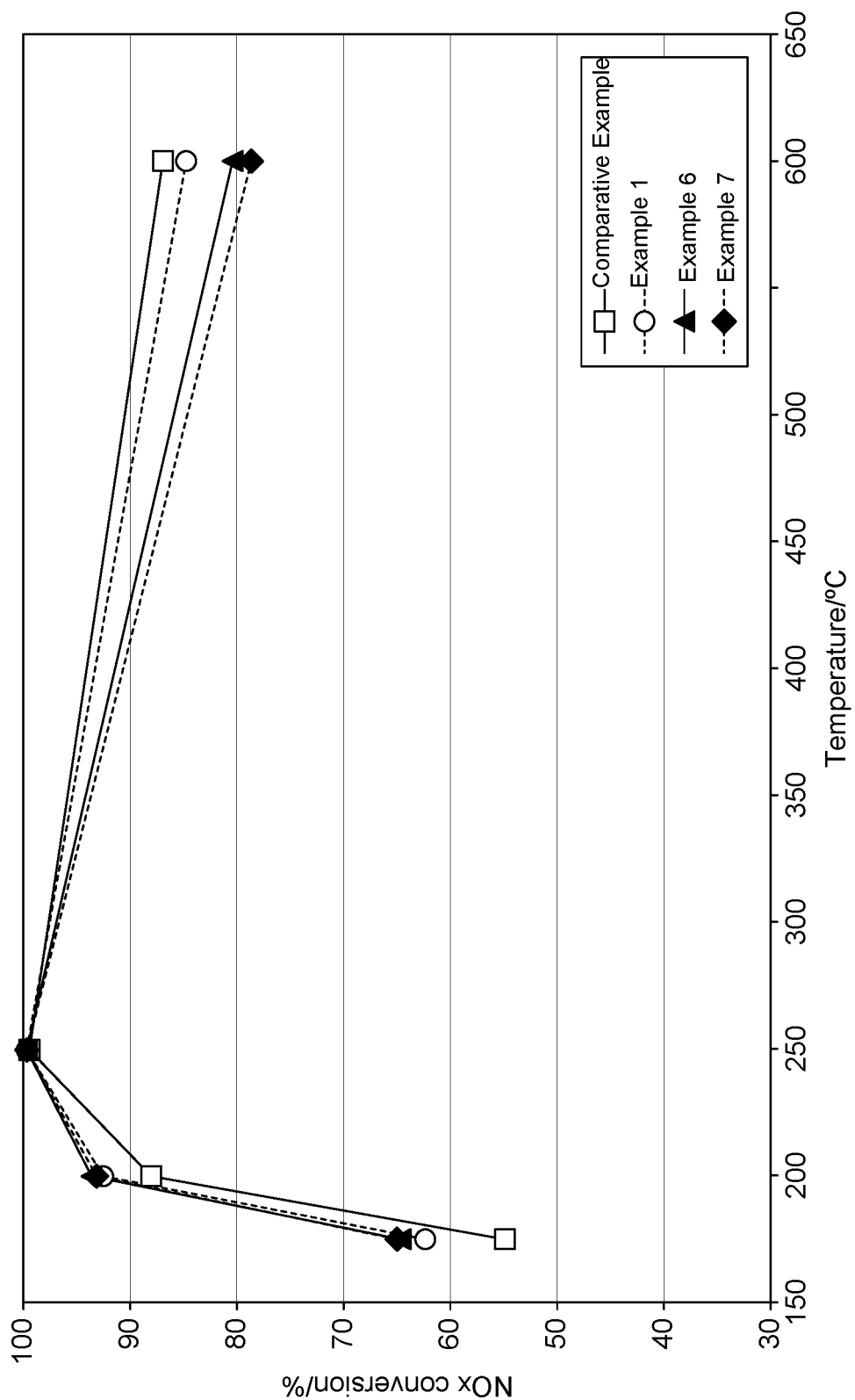
FIG. 1 is a graph demonstrating the NOx conversion activity of the aged catalysts of the comparative example and examples 1, 6 and 7 tested at 175° C., 200° C., 250° C. and 600° C.

Compositions, methods, and systems of the present invention relate to a catalytic composition for treating a NOx-containing exhaust gas, wherein the composition comprises a copper-substituted small-pore zeolite comprising:

i) Ce and/or La in a total amount of about 5 to about 400 g/ft$^3$; and ii) Nd and/or Nb in a total amount of about 5 to about 400 g/ft$^3$.

The present invention will now be further described. In the following passages different aspects of the invention are defined in more detail. Each aspect so defined may be combined with any other aspect or aspects unless clearly indicated to the contrary. In particular, any feature described herein may be combined with any other feature or features indicated as being preferred or advantageous.

Catalytic Composition

The catalytic composition comprises a copper-substituted small-pore zeolite comprising: i) Ce and/or La in a total amount of about 5 to about 400 g/ft$^3$; and ii) Nd and/or Nb in a total amount of about 5 to about 400g/ft$^3$. The catalytic composition comprises a copper-substituted small-pore zeolite consists essentially of: i) Ce and/or La in a total amount of about 5 to about 400 g/ft$^3$; and ii) Nd and/or Nb in a total amount of about 5 to about 400g/ft$^3$. The catalytic composition comprises a copper-substituted small-pore zeolite consisting of: i) Ce and/or La in a total amount of about 5 to about 400 g/ft$^3$; and ii) Nd and/or Nb in a total amount of about 5 to about 400g/ft$^3$.

In some aspects, the catalytic composition comprises a copper-substituted small-pore zeolite comprising: i) Ce and La in a total amount of about 5 to about 400 g/ft$^3$; and ii) Nd and Nb in a total amount of about 5 to about 400g/ft$^3$. In some aspects, the catalytic composition comprises a copper-substituted small-pore zeolite comprising: i) Ce or La in a total amount of about 5 to about 400 g/ft$^3$; and ii) Nd or Nb in a total amount of about 5 to about 400g/ft³. In some aspects, the catalytic composition comprises a copper-substituted small-pore zeolite comprising: i) Ce in a total amount of about 5 to about 400 g/ft³; and ii) Nd and/or Nb in a total amount of about 5 to about 400g/ft³. In some aspects, the catalytic composition comprises a copper-substituted small-pore zeolite comprising: i) La in a total amount of about 5 to about 400 g/ft³; and ii) Nd and/or Nb in a total amount of about 5 to about 400g/ft³. In some aspects, the catalytic composition comprises a copper-substituted small-pore zeolite comprising: i) Ce and/or La in a total amount of about 5 to about 400 g/ft³; and ii) Nd in a total amount of about 5 to about 400g/ft³. In some aspects, the catalytic composition comprises a copper-substituted small-pore zeolite comprising: i) Ce and/or La in a total amount of about 5 to about 400 g/ft³; and ii) Nb in a total amount of about 5 to about 400g/ft³. In some aspects, the catalytic composition comprises a copper-substituted small-pore zeolite comprising: i) Ce in a total amount of about 5 to about 400 g/ft³; and ii) Nd in a total amount of about 5 to about 400g/ft³. In some aspects, the catalytic composition comprises a copper-substituted small-pore zeolite comprising: i) Ce in a total amount of about 5 to about 400 g/ft³; and ii) Nb in a total amount of about 5 to about 400g/ft³. In some aspects, the catalytic composition comprises a copper-substituted small-pore zeolite comprising: i) La in a total amount of about 5 to about 400 g/ft³; and ii) Nd in a total amount of about 5 to about 400g/ft³. In some aspects, the catalytic composition comprises a copper-substituted small-pore zeolite comprising: i) La in a total amount of about 5 to about 400 g/ft³; and ii) Nb in a total amount of about 5 to about 400g/ft³. In some aspects, the copper-substituted zeolite comprises further metals in addition to Cu, Ce, La, Nd, and/or Nb.

Zeolites

Zeolites are structures formed from alumina and silica and the silica-to-alumina molar ratio ("SAR") determines the reactive sites within the zeolite structure.

In some aspects, a suitable zeolite has a silica to alumina molar ratio (SAR) of from 5 to 200 (e.g. 10 to 200); 10 to 100 (e.g. 10 to 30 or 20 to 80); 10 to 50; 10 to 30; 12 to 40; 15 to 30; 5 to 20; 5 to 15; 8 to 15; 8 to 13; 10 to 15; 10 to 20; 10 to 40; 10 to 60; 10 to 80; 10 to 100; 10 to 150; <30; <20; <15; or <13. In some aspects, a suitable molecular sieve has a SAR of >200; >600; or >1200. In some aspects, the molecular sieve has a SAR of from about 1500 to about 2100.

In some aspects, the zeolite is a small-pore zeolite. Small-pore zeolites possess pores that are constructed of eight tetrahedral atoms ($Si^{4+}$ and $Al^{3+}$), each time linked by a shared oxygen. These eight-member ring pores provide small molecules access to the intracrystalline void space, e.g., to NOx during car exhaust cleaning (NOx removal) or to methanol en route to its conversion into light olefins, while restricting larger molecule entrance and departure that is critical to overall catalyst performance. While a small pore zeolite is a material comprising pore openings having 8 tetrahedral atoms in a ring, a medium pore zeolite is one where the smallest pores have 10 tetrahedral atoms in a ring and a large pore zeolite is one where the smallest pores have 12 tetrahedral atoms in a ring.

In some aspects, the small-pore zeolite has a framework structure selected from the group consisting of AEI, AFT, AFV, AFX, AVL, CHA, EMT, GME, KFI, LEV, LTN, and SFW, including mixtures or intergrowths of two or more thereof. In particular aspects, the zeolite has a CHA and/or AEI-type framework structure.

In some aspects, the small-pore zeolite has a silica to alumina molar ratio (SAR) of less than about 30, about 5 to about 30, or about 10 to about 30.

When the zeolite is a medium pore zeolite, then the medium pore zeolite may have a framework structure selected from the group consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI and WEN, or a mixture and/or an intergrowth of two or more thereof. In some aspects, the medium pore zeolite has a framework structure selected from the group consisting of FER, MEL, MFI, and STT.

When the zeolite is a large pore zeolite, then the large pore zeolite may have a framework structure selected from the group consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, and VET, or a mixture and/or an intergrowth of two or more thereof. In some aspects, the large pore zeolite has a framework structure selected from the group consisting of AFI, BEA, MAZ, MOR, and OFF.

Copper

Zeolites of the present invention are copper-substituted. Copper may be incorporated through known techniques, such as ion-exchange. The copper may be present in the copper-substituted zeolite in an amount of from about 1 to about 6 wt %, about 3 to about 5.5 wt %, about 3.2 to about 4.8 wt %, or about 4 wt %. The reference to wt % is the weight of copper relative to the total weight of the copper-substituted zeolite.

Ce and/or La

Copper-substituted zeolites of the present invention include Ce and/or La. In some aspects, copper-substituted zeolites of the present invention include Ce and La. In some aspects, copper-substituted zeolites of the present invention include Ce or La. In some aspects, copper-substituted zeolites of the present invention include Ce. In some aspects, copper-substituted zeolites of the present invention include La. The catalytic composition comprises Ce and/or La in a total amount of about 5 to about 400 g/ft³, or about 50 to about 200 g/ft³.

Nd and/or Nb

Copper-substituted zeolites of the present invention include Nd and/or Nb. In some aspects, copper-substituted zeolites of the present invention include Nd and Nb. In some aspects, copper-substituted zeolites of the present invention include Nd or Nb. In some aspects, copper-substituted zeolites of the present invention include Nd. In some aspects, copper-substituted zeolites of the present invention include Nb. The catalytic composition comprises Nd and/or Nb in a total amount of about 5 to about 400 g/ft³, about 50 to about 200 g/ft³, greater than about 100 g/ft³, greater than about 150 g/ft³, or about 150 to about 250 g/ft³.

Weight Ratios of Ce and/or La to Nd and/or Nb

In some aspects, a copper-substituted zeolite includes a total amount Ce and/or La and a total amount of Nd and/or Nb in a weight ratio of about 1:1. In some aspects, a copper-substituted zeolite includes a total amount Ce and/or La and a total amount of Nd and/or Nb in a weight ratio of about 0.1 to about 50; about 0.2 to about 15; or about 0.33 to about 3. Catalysts of the present invention can be prepared by any suitable means known in the art, including, for example, one pot, prefixing, and spray drying.

Catalyst Article

According to a further aspect there is provided a catalyst article for an exhaust gas system, the catalyst article comprising the catalytic composition as described herein. Techniques for forming such catalyst articles comprising catalytic compositions are well known in the art.

A catalyst article of the present invention may include a substrate and a catalytic composition. The substrate may be a flow-through substrate or a filtering substrate. The substrate may comprise the catalytic composition (i.e., the catalyst article is obtained by extrusion) or the catalytic composition may be disposed or supported on the substrate (i.e. the catalytic composition is applied onto the substrate by a washcoating method). The catalytic composition may coat the substrate entirely or partially, as desired. In some aspects, a catalyst article includes a Cu/Mn/Ce zeolite extruded article which is coated with one or more additional catalysts. In some aspects, the extruded catalyst is coated with one or more additional SCR catalysts, which could include, for example, a Cu/Mn/Ce zeolite.

In some aspects, the catalyst article may comprise the catalytic composition in a total concentration of about 0.5 to about 4.0 g in 3; about 1.0 to about 3.0 g in 3; or about 1.2 to about 2.5 g/in3.

When the catalyst article has a filtering substrate, then it is a selective catalytic reduction filter catalyst. The selective catalytic reduction filter comprises a filtering substrate and the catalyst composition. References to use of SCR catalysts throughout this application are understood to include use of selective catalytic reduction filter catalysts as well, where applicable.

The flow-through or filter substrate is a substrate that is capable of containing catalyst/adsorber components. The substrate is preferably a ceramic substrate or a metallic substrate. The ceramic substrate may include any suitable refractory material, e.g., alumina, silica, titania, ceria, zirconia, magnesia, zeolites, silicon nitride, silicon carbide, zirconium silicates, magnesium silicates, aluminosilicates, metallo aluminosilicates (such as cordierite and spudomene), or a mixture or mixed oxide of any two or more thereof. Cordierite, a magnesium aluminosilicate, and silicon carbide are particularly preferred.

The metallic substrates may be made of any suitable metal, and in particular heat-resistant metals and metal alloys such as titanium and stainless steel as well as ferritic alloys containing iron, nickel, chromium, and/or aluminum in addition to other trace metals.

The flow-through substrate is preferably a flow-through monolith having a honeycomb structure with many small, parallel thin-walled channels running axially through the substrate and extending throughout from an inlet or an outlet of the substrate. The channel cross-section of the substrate may be any shape, but is preferably square, sinusoidal, triangular, rectangular, hexagonal, trapezoidal, circular, or oval. The flow-through substrate may also be high porosity which allows the catalyst to penetrate into the substrate walls.

The filter substrate is preferably a wall-flow monolith filter. The channels of a wall-flow filter are alternately blocked, which allow the exhaust gas stream to enter a channel from the inlet, then flow through the channel walls, and exit the filter from a different channel leading to the outlet. Particulates in the exhaust gas stream are thus trapped in the filter.

The catalytic composition may be added to the flow-through or filter substrate by any known means, such as a washcoat procedure.

When the catalyst article is selective catalytic reduction filter, then the filtering substrate may preferably be a wall flow filter substrate monolith. The wall flow filter substrate monolith (e.g. of the SCR-DPF) typically has a cell density of 60 to 400 cells per square inch (cpsi). It is preferred that the wall flow filter substrate monolith has a cell density of 100 to 350 cpsi, more preferably 200 to 300 cpsi.

The wall flow filter substrate monolith may have a wall thickness (e.g. average internal wall thickness) of 0.20 to 0.50 mm, preferably 0.25 to 0.35 mm (e.g. about 0.30 mm).

Generally, the uncoated wall flow filter substrate monolith has a porosity of from 50 to 80%, preferably 55 to 75%, and more preferably 60 to 70%. The uncoated wall flow filter substrate monolith typically has a mean pore size of at least 5 µm. It is preferred that the mean pore size is from 10 to 40 µm, such as 15 to 35 µm, more preferably 20 to 30 µm.

The wall flow filter substrate may have a symmetric cell design or an asymmetric cell design.

In general, for a selective catalytic reduction filter, the catalyst composition is disposed within the wall of the wall-flow filter substrate monolith. Additionally, the catalytic composition may be disposed on the walls of the inlet channels and/or on the walls of the outlet channels.

Catalytic compositions of aspects of the present invention may be coated on a suitable monolith substrate. Washcoat compositions containing the catalytic compositions of the present invention for coating onto the monolith substrate or for manufacturing extruded type substrate monoliths can comprise a binder selected from the group consisting of alumina, silica, (non zeolite) silica-alumina, naturally occurring clays, $TiO_2$, $ZrO_2$, and $SnO_2$. In general, catalyst articles comprising the catalytic composition in a desired loading level may be prepared by washcoating, extrusion, or other methods known in the art.

Exhaust Gas System and Methods

According to a further aspect there is provided an exhaust gas system comprising the catalyst article described herein and a combustion engine, preferably a diesel engine. The catalyst article is arranged downstream of the engine to treat the exhaust gas emitted therefrom.

Methods of the present invention relate to treating exhaust gas containing nitrogen oxides, by contacting the exhaust gas with a reductant, such as a nitrogenous reductant or hydrocarbon reductant, in the presence of a catalyst composition as described herein. As such, catalytic compositions of the present invention may function as selective catalytic reduction catalysts.

In some aspects, the nitrogen oxides are reduced with the reducing agent at a temperature of at least 100° C. In some aspects, the catalysts as described herein are effective at reducing nitrogen oxides with the reducing agent over a wide temperature range (e.g., from about 150° C. to 750° C.) in addition to being hydrothermally stable at temperatures above 900° C. The latter characteristics may be particularly useful for treating exhaust gases from heavy and light duty diesel engines, particularly engines comprising exhaust systems comprising (optionally catalyzed) diesel particulate filters which are regenerated actively, e.g. by injecting hydrocarbon into the exhaust system upstream of the filter, wherein the zeolite catalyst for use in the present invention is located downstream of the filter.

In a particular aspect, the catalysts as described herein are effective at reducing nitrogen oxides with the reducing agent in a temperature range of from 175 to 550° C. In another aspect, the temperature range is from 175 to 400° C. In some aspects, the temperature range is from 275 to 500° C., or 250 to 550° C. When $N_2O$ is present in the gas stream, the temperature range may be wider, such as 150 to 650° C.; 175 to 625° C.; 200 to 600° C.; or 225 to 575° C.

Benefits of the Invention

It has surprisingly been discovered that catalytic compositions of the present invention provide unexpected benefits. The presence of Ce and/or La in a catalytic composition gives a low temperature NOx conversion improvement, but at higher temperatures it performs less well. The addition of Nd and/or Nb does not compromise the low temperature performance and makes the high temperature performance of the catalytic composition less compromised than it is with just Ce and/or La. NOx conversion upon aging is better, especially for Cu/Ce/Nd.

Although preferred embodiments of the invention have been described herein in detail, it will be understood by those skilled in the art that variations may be made thereto without departing from the scope of the invention or of the appended claims.

The invention will now be described further in relation to the following non-limiting examples and figures.

EXAMPLES

The catalysts of the comparative example and examples 1 to 5 comprise a copper small-pore zeolite. However, in the comparative example, the copper small-pore zeolite is in its acid form (i.e. not substituted) whereas in examples 1 to 5, the copper small-pore zeolite is substituted with one or more of Ce, Nd, Nb and La. The catalysts of the comparative example and examples 1 to 14 were aged for 16 hours at 800° C. Their compositions are set out in Table 1 below. The copper-substituted small-pore zeolite referred to in the compositions for the comparative Example and Examples 1 to 15 is a CHA zeolite having a SAR of 13.

TABLE 1

| Example | Preparation | Composition |
|---|---|---|
| Comparative Example | | Copper-substituted small-pore zeolite in its acid form comprising 4 wt % Cu |
| Example 1 | washcoated with a solution comprising cerium acetate | Copper-substituted small-pore zeolite comprising 4 wt % Cu and 100 g/ft$^3$ Ce |
| Example 2 | washcoated with a solution comprising neodymium acetate | Copper-substituted small-pore zeolite comprising 4 wt % Cu and 100 g/ft$^3$ Nd |
| Example 3 | washcoated with a solution comprising niobium oxalate | Copper-substituted small-pore zeolite comprising 4 wt % Cu and 400 g/ft$^3$ Nb |
| Example 4 | washcoated with a solution comprising lanthanum acetate and niobium oxalate | Copper-substituted small-pore zeolite comprising 4 wt % Cu, 100 g/ft$^3$ La and 100 g/ft$^3$ Nb |
| Example 5 | washcoated with a solution comprising cerium acetate and niobium oxalate | Copper-substituted small-pore zeolite comprising 4 wt % Cu, 100 g/ft$^3$ Ce and 100 g/ft$^3$ Nb |
| Example 6 | washcoated with a solution comprising cerium acetate | Copper-substituted small-pore zeolite comprising 4 wt % Cu and 200 g/ft$^3$ Ce |
| Example 7 | washcoated with a solution comprising cerium acetate | Copper-substituted small-pore zeolite comprising 4 wt % Cu and 400 g/ft$^3$ Ce |
| Example 8 | washcoated with a solution comprising neodymium acetate | Copper-substituted small-pore zeolite comprising 4 wt % Cu and 200 g/ft$^3$ Nd |
| Example 9 | washcoated with a solution comprising neodymium acetate | Copper-substituted small-pore zeolite comprising 4 wt % Cu and 400 g/ft$^3$ Nd |
| Example 10 | washcoated with a solution comprising niobium oxalate | Copper-substituted small-pore zeolite comprising 4 wt % Cu and 100 g/ft$^3$ Nb |
| Example 11 | washcoated with a solution comprising niobium oxalate | Copper-substituted small-pore zeolite comprising 4 wt % Cu and 200 g/ft$^3$ Nb |
| Example 12 | washcoated with a solution comprising neodymium acetate | Copper-substituted small-pore zeolite comprising 4 wt % Cu and 150 g/ft$^3$ Nd |
| Example 13 | washcoated with a solution comprising cerium acetate and neodymium acetate | Copper-substituted small-pore zeolite comprising 4 wt % Cu, 100 g/ft$^3$ Ce and 150 g/ft$^3$ Nd |
| Example 14 | washcoated with a solution comprising cerium acetate and neodymium acetate | Copper-substituted small-pore zeolite comprising 4 wt % Cu, 125 g/ft$^3$ Ce and 75 g/ft$^3$ Nd |
| Example 15 | washcoated with a solution comprising cerium acetate | Copper-substituted small-pore zeolite comprising 4 wt % Cu, 100 g/ft$^3$ Ce |

The aged catalysts of the comparative example and examples 1 to 5 were tested for their NOx activity at 250° C., 200° C. and 175° C. using a gas flow comprising 500 ppm NO, 750 ppm $NH_3$, 350 ppm CO, 8% $CO_2$, 10% $O_2$, 5% $H_2O$, balance $N_2$ and the results are set out in Table 2 below.

TABLE 2

| Example | % NOx conversion at 250° C. | % NOx conversion at 200° C. | % NOx conversion at 175° C. |
| --- | --- | --- | --- |
| Comparative Example | 99.49% | 88.07% | 54.80% |
| Example 1 | 99.90% | 92.31% | 62.32% |
| Example 2 | 99.74% | 89.93% | 59.21% |
| Example 3 | 99.94% | 89.49% | 57.67% |
| Example 4 | 99.80% | 91.38% | 59.49% |
| Example 5 | 99.86% | 91.55% | 61.22% |

As can be seen from the data in Table 2, at low temperatures, the presence of Ce and La in the copper-substituted small-pore zeolite provides improved NOx activity compared to the copper small-pore zeolite in its acid form. As exemplified by the data for examples 4 and 5, the presence of Nb in addition to Ce or La does not significantly compromise the improved low temperature performance. Indeed, the low temperature NOx performance of example 4 (substituted with La and Nb) and example 5 (substituted with Ce and Nb) is still significantly better than the comparative example (not substituted) and example 3 (substituted with just Nb).

The aged catalysts of the comparative example and example 3 were tested for their NOx activity at 600° C. using a gas flow comprising 500 ppm NO, 750 ppm $NH_3$, 350 ppm CO, 8% $CO_2$, 10% $O_2$, 5% $H_2O$, balance $N_2$ and the results are set out in Table 3 below.

TABLE 3

| Example | % NOx conversion at 600° C. |
| --- | --- |
| Comparative Example | 87.00% |
| Example 3 | 94.56% |

As shown in Table 3, the presence of Nb in the copper-substituted small-pore zeolite provides improved NOx activity at high temperatures compared to the copper small pore zeolite in its acid form.

The present invention will now be described with reference to the following non-limiting Figures, FIGS. 1 to 11 which include NOx conversion activity and $N_2O$ selectivity for the catalysts of examples 1 to 15 tested using a gas flow comprising 500 ppm NO, 750 ppm $NH_3$, 350 ppm CO, 8% $CO_2$, 10% $O_2$, 5% $H_2O$, balance $N_2$.

FIG. 1 is a graph demonstrating the NOx conversion activity of the aged catalysts of the comparative example and examples 1, 6 and 7 tested at 175° C., 200° C., 250° C. and 600° C.

Figure 2:
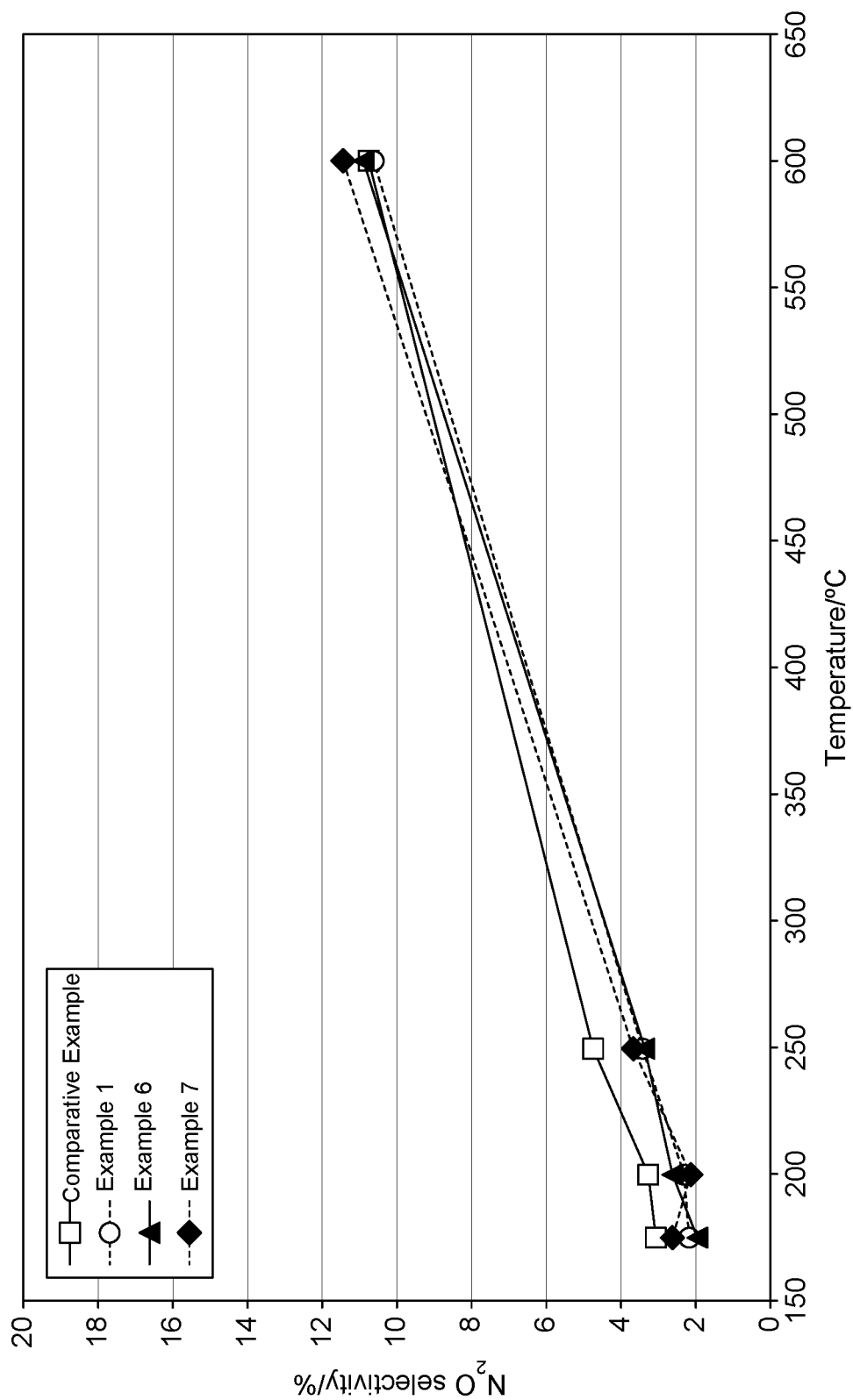
FIG. 2 is a graph demonstrating N$_2$O selectivity of the aged catalysts of the comparative example and examples 1, 6 and 7 tested at 175° C., 200° C., 250° C. and 600° C.

FIG. 2 is a graph demonstrating $N_2O$ selectivity of the aged catalysts of the comparative example and examples 1, 6 and 7 tested at 175° C., 200° C., 250° C. and 600° C.

Figure 3:
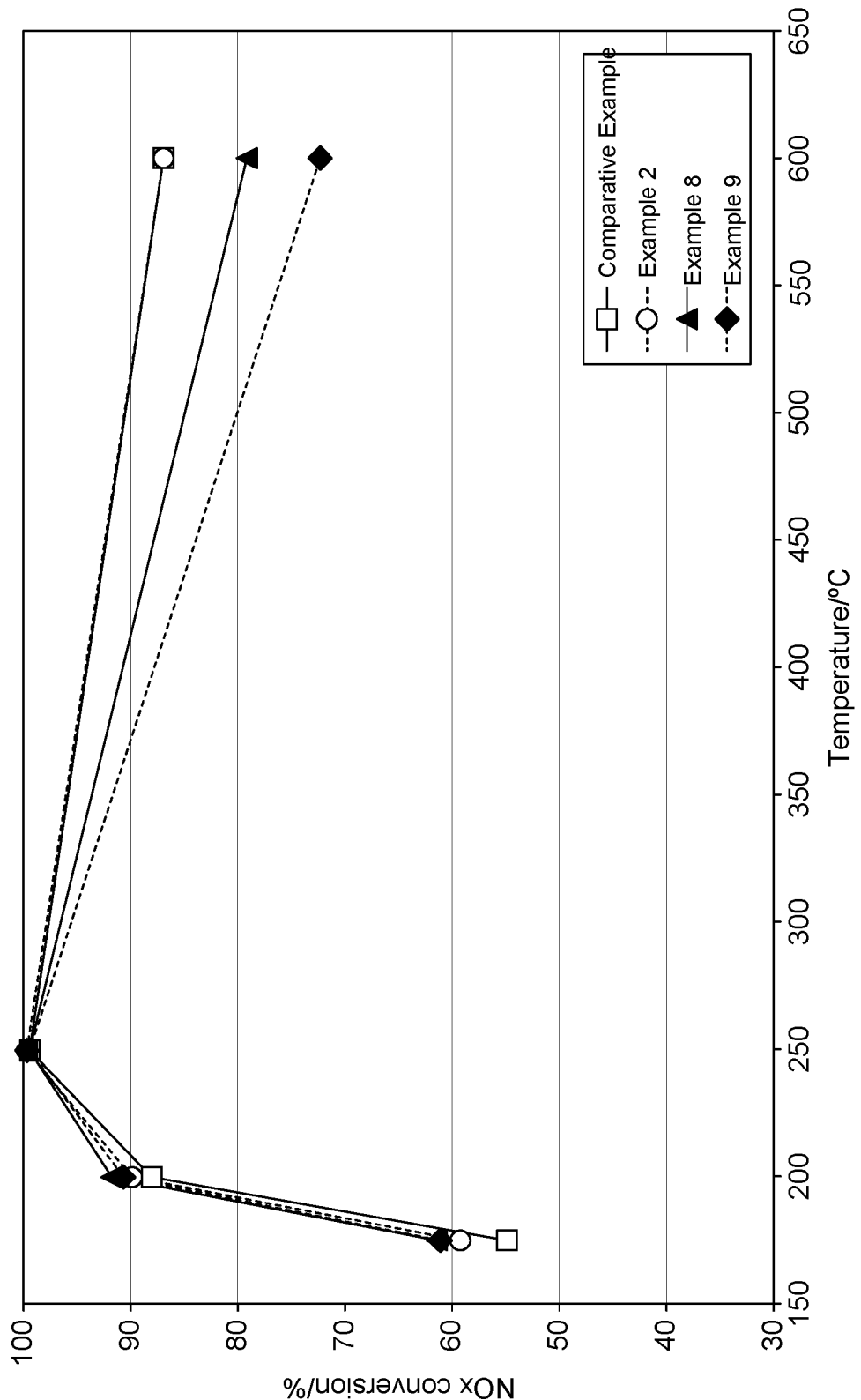
FIG. 3 is a graph demonstrating the NOx conversion activity of the aged catalysts of the comparative example and examples 2, 8 and 9 tested at 175° C., 200° C., 250° C. and 600° C.

FIG. 3 is a graph demonstrating the NOx conversion activity of the aged catalysts of the comparative example and examples 2, 8 and 9 tested at 175° C., 200° C., 250° C. and 600° C.

Figure 4:
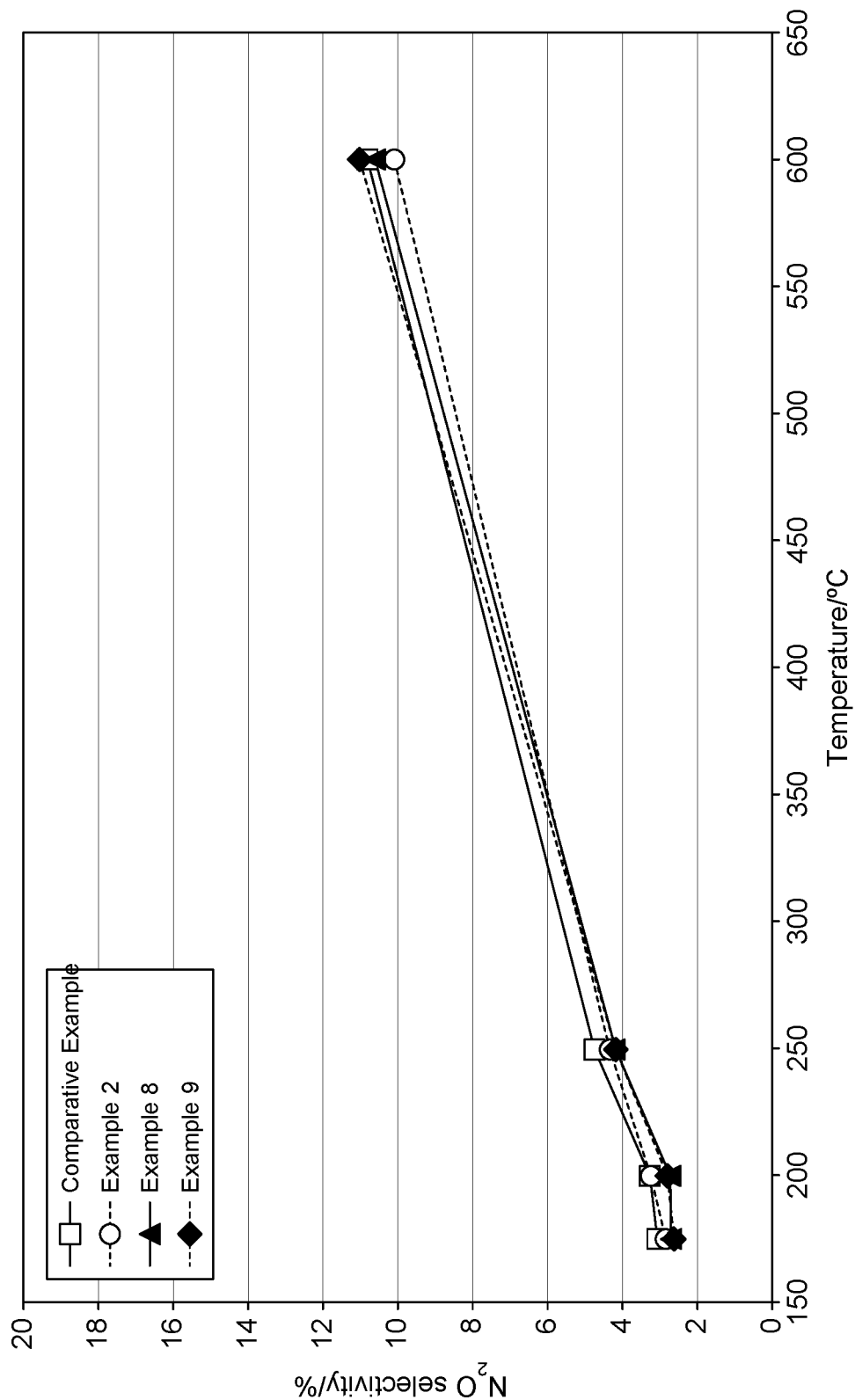
FIG. 4 is a graph demonstrating N$_2$O selectivity of the aged catalysts of the comparative example and examples 2, 8 and 9 tested at 175° C., 200° C., 250° C. and 600° C.

FIG. 4 is a graph demonstrating $N_2O$ selectivity of the aged catalysts of the comparative example and examples 2, 8 and 9 tested at 175° C., 200° C., 250° C. and 600° C.

Figure 5:
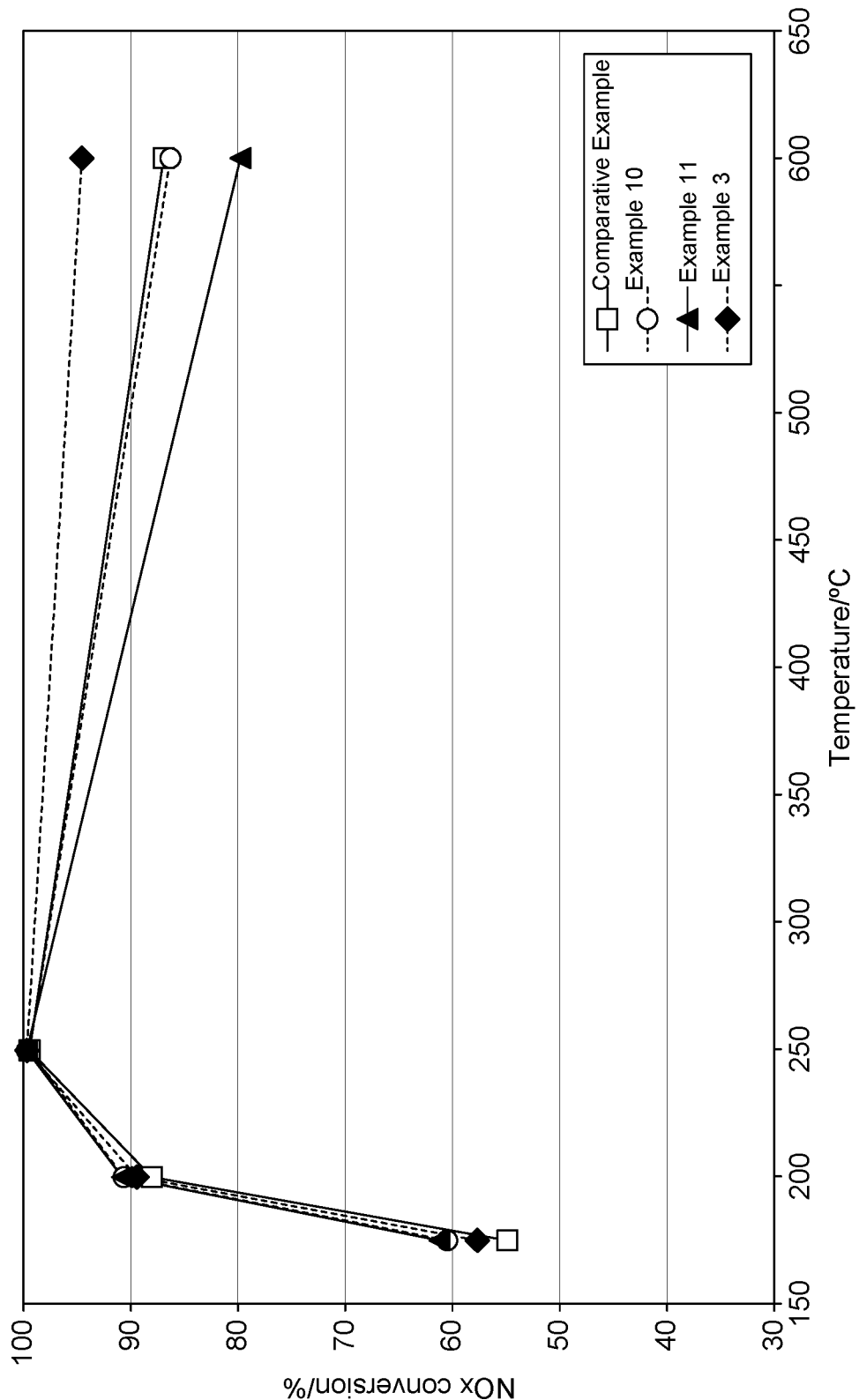
FIG. 5 is a graph demonstrating the NOx conversion activity of the aged catalysts of the comparative example and examples 3, 10 and 11 tested at 175° C., 200° C., 250° C. and 600° C.

FIG. 5 is a graph demonstrating the NOx conversion activity of the aged catalysts of the comparative example and examples 3, 10 and 11 tested at 175° C., 200° C., 250° C. and 600° C.

Figure 6:
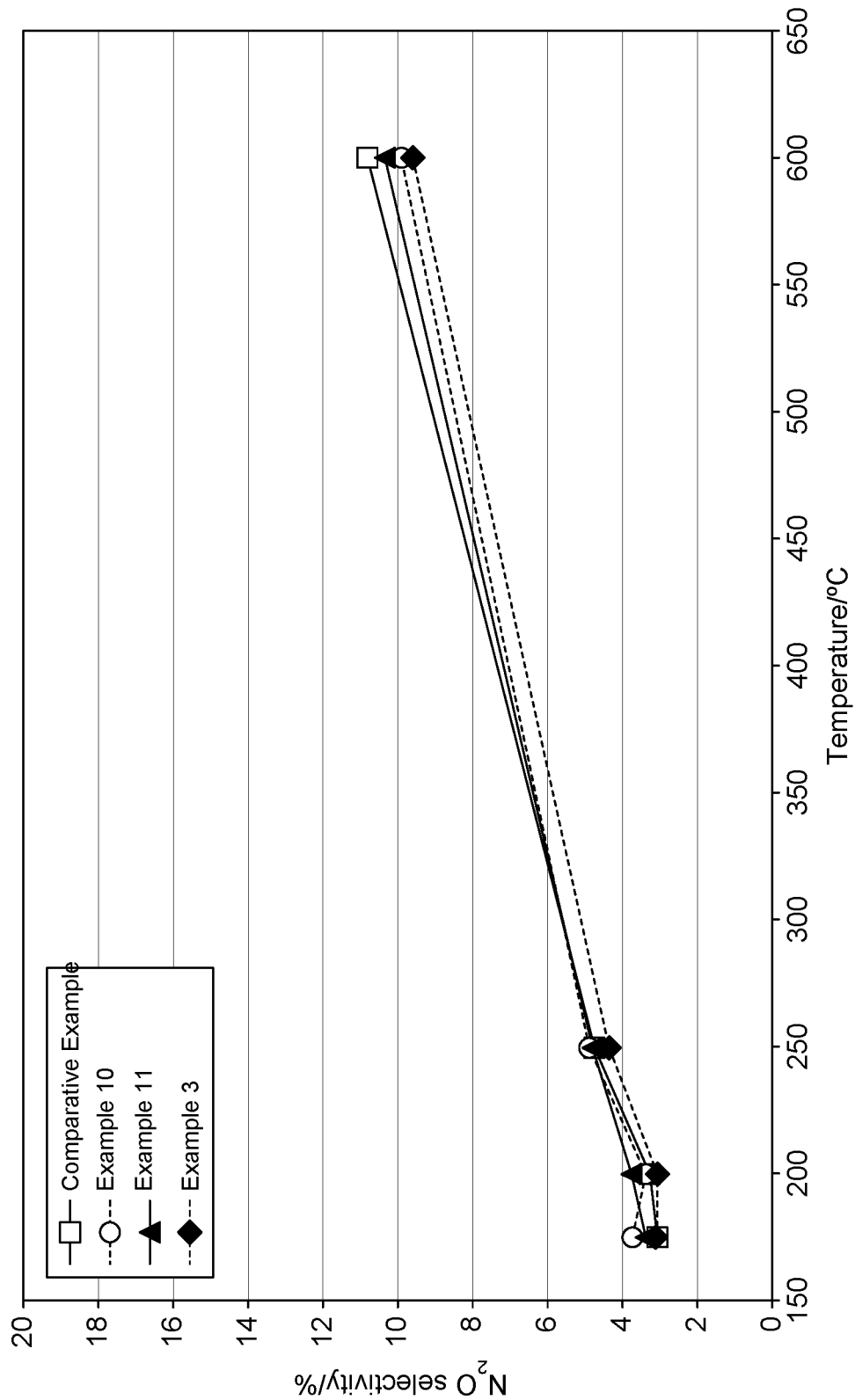
FIG. 6 is a graph demonstrating N$_2$O selectivity of the aged catalysts of the comparative example and examples 3, 10 and 11 tested at 175° C., 200° C., 250° C. and 600° C.

FIG. 6 is a graph demonstrating $N_2O$ selectivity of the aged catalysts of the comparative example and examples 3, 10 and 11 tested at 175° C., 200° C., 250° C. and 600° C.

Figure 7:
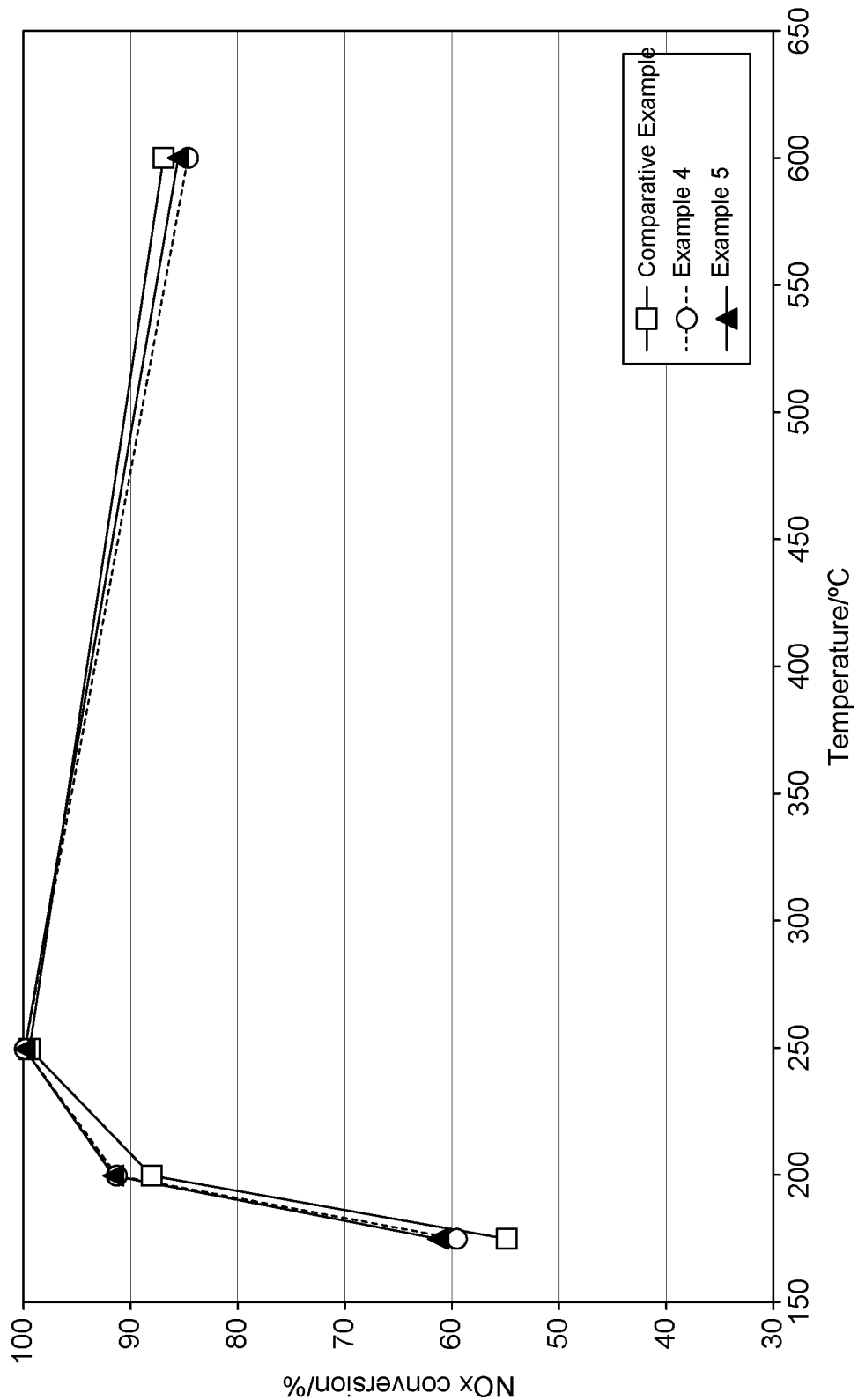
FIG. 7 is a graph demonstrating the NOx conversion activity of the aged catalysts of the comparative example and examples 4 and 5 tested at 175° C., 200° C., 250° C. and 600° C.

FIG. 7 is a graph demonstrating the NOx conversion activity of the aged catalysts of the comparative example and examples 4 and 5 tested at 175° C., 200° C., 250° C. and 600° C.

Figure 8:
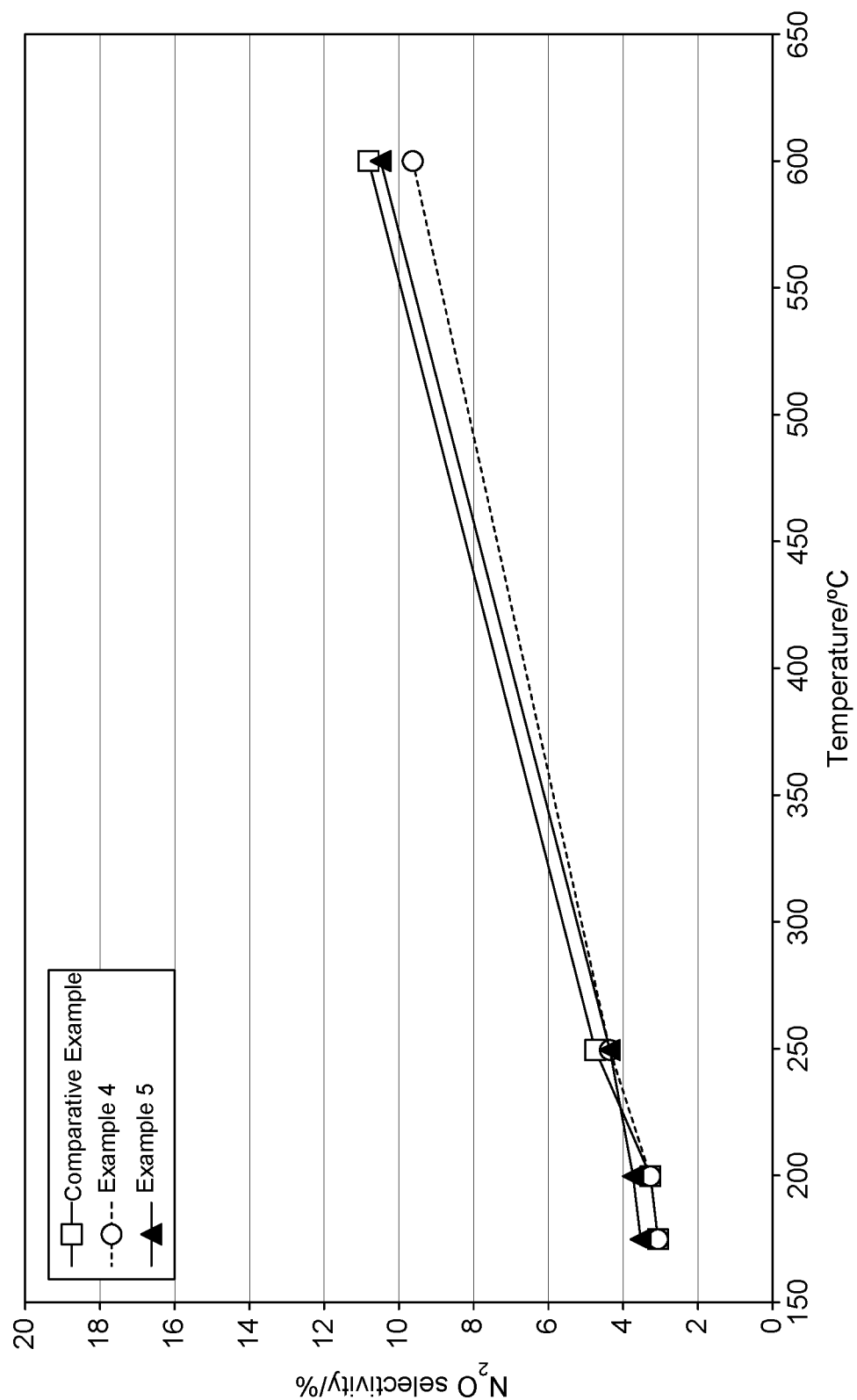
FIG. 8 is a graph demonstrating the N$_2$O selectivity of the aged catalysts of the comparative example and examples 4 and 5 tested at 175° C., 200° C., 250° C. and 600° C.

FIG. 8 is a graph demonstrating the $N_2O$ selectivity of the aged catalysts of the comparative example and examples 4 and 5 tested at 175° C., 200° C., 250° C. and 600° C.

Figure 9:
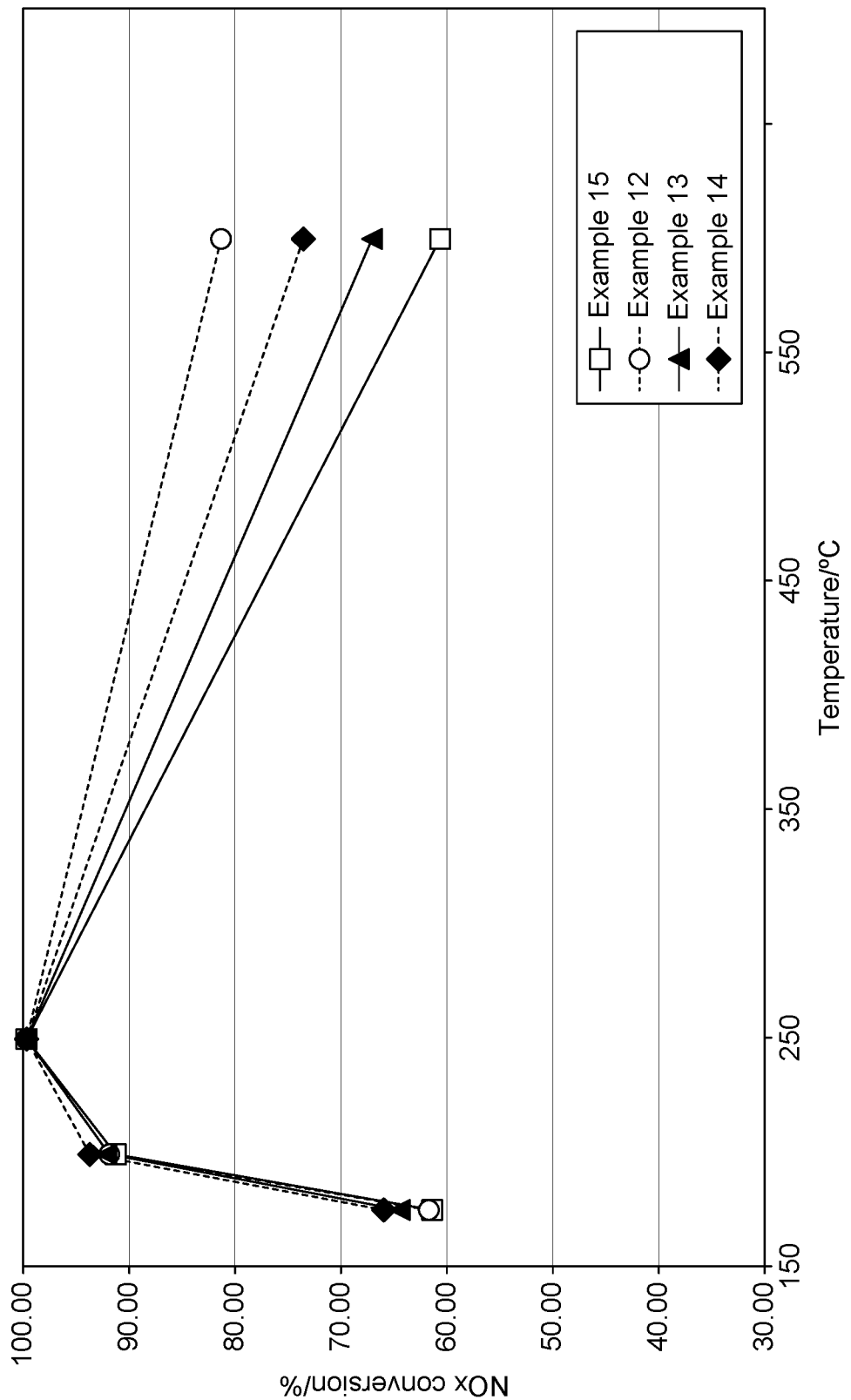
FIG. 9 is a graph demonstrating the NOx conversion activity of the aged catalysts of the comparative example and examples 12, 13, 14 and 15 tested at 175° C., 200° C., 250° C. and 600° C.

FIG. 9 is a graph demonstrating the NOx conversion activity of the aged catalysts of the comparative example and examples 12, 13, 14 and 15 tested at 175° C., 200° C., 250° C. and 600° C.

Figure 10:
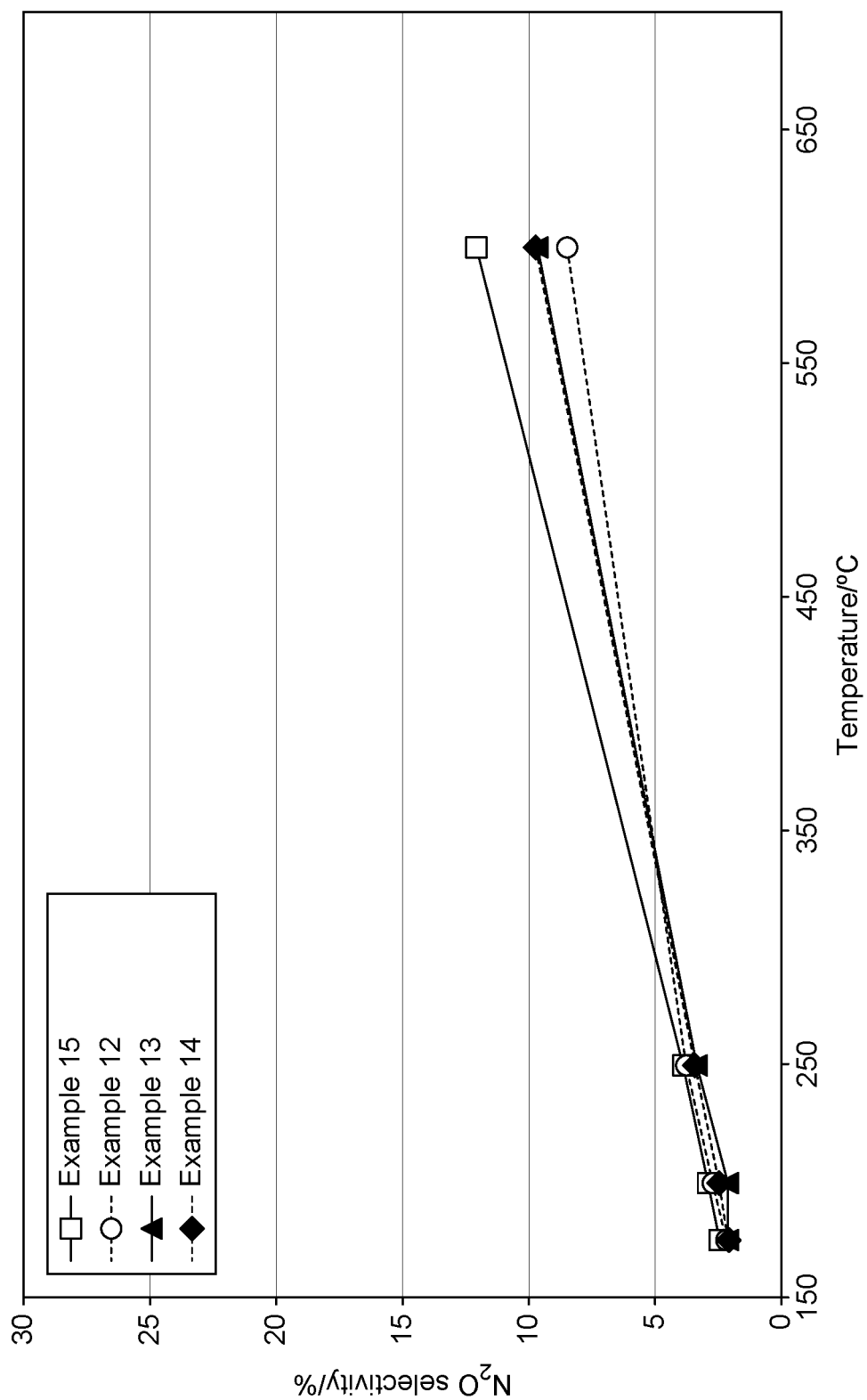
FIG. 10 is a graph demonstrating the N$_2$O selectivity of the aged catalysts of the comparative example and examples 12, 13, 14 and 15 tested at 175° C., 200° C., 250° C. and 600° C.

FIG. 10 is a graph demonstrating the $N_2O$ selectivity of the aged catalysts of the comparative example and examples 12, 13, 14 and 15 tested at 175° C., 200° C., 250° C. and 600° C.

Figure 11:
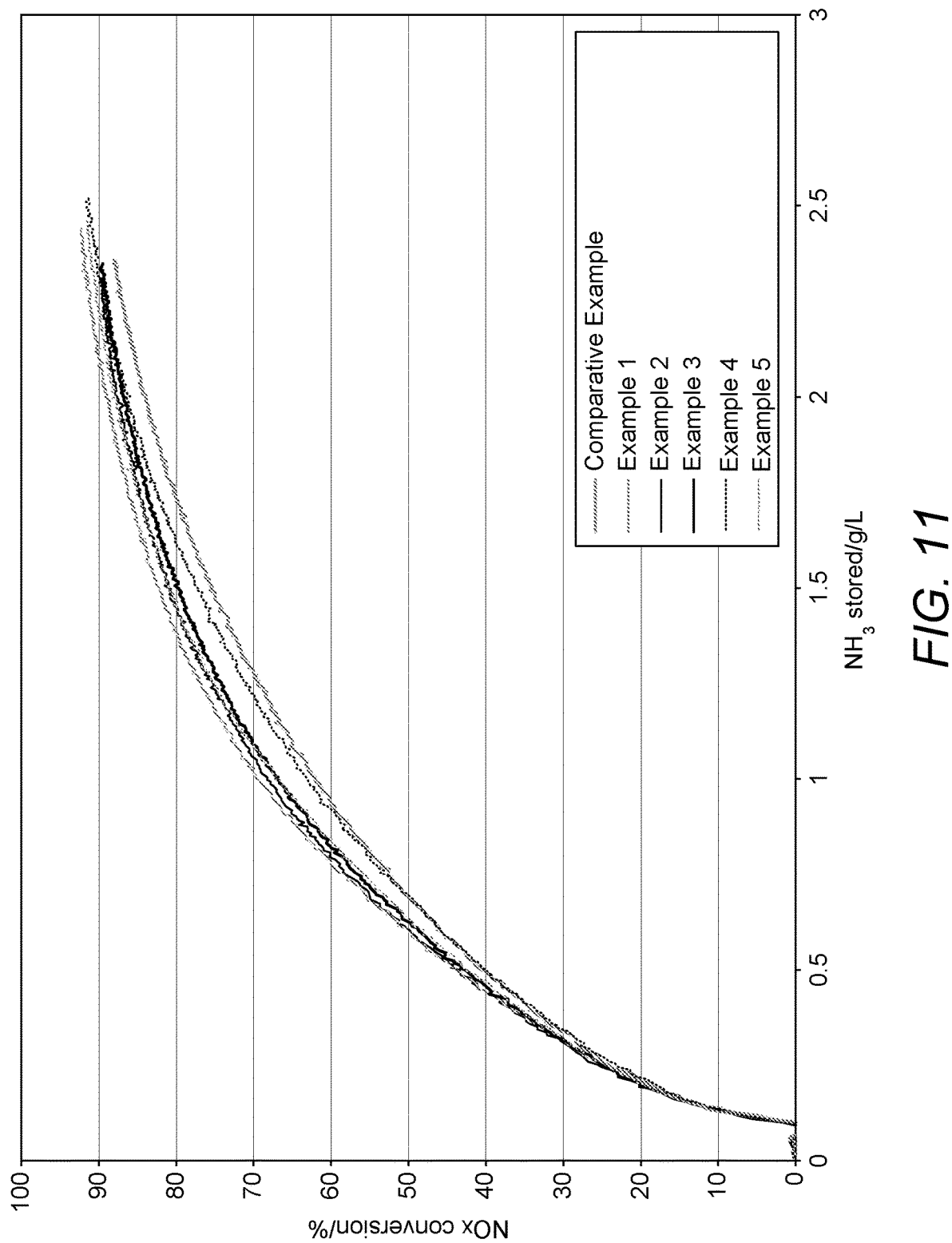
FIG. 11 a graph demonstrating the NOx conversion activity of the aged catalysts of the comparative example and examples 1 to 5 tested at 200° C.

FIG. 11 a graph demonstrating the NOx conversion activity of the aged catalysts of the comparative example and examples 1 to 5 tested at 200° C.

FIG. 1 includes data for aged catalysts of the comparative example and examples 1, 6 and 7 and demonstrates the effect of loading of Cerium on NOx performance. As shown in FIG. 1, increase in loading of Cerium leads to improved low temperature NOx performance but reduced high temperature NOx performance.

FIG. 2 includes data for aged catalysts of the comparative example and examples 1, 6 and 7 and demonstrates the effect of loading of Cerium on $N_2O$ selectivity. As shown in FIG. 2, increased loading of Cerium leads to lower $N_2O$ selectivity at low temperatures and similar or worse $N_2O$ selectivity at high temperatures compared to the compared to the copper small-pore zeolite in its acid form.

FIG. 3 includes data for aged catalysts of the comparative example and examples 2, 8 and 9 and demonstrates the effect of loading of Neodymium on NOx performance. As shown in FIG. 3, increase in loading of Neodymium leads to improved low temperature NOx performance but not as significantly compared to loading of Cerium as shown in FIG. 1. Substituting the small-pore zeolite with 200g/ft³ or more of Neodynium leads to reduced high temperature NOx performance. Example 2 where the copper small-pore zeolite comprises 100g/ft³ of neodymium, has improved low temperature NOx activity and similar high temperature NOx activity compared to the copper small-pore zeolite in its acid form.

FIG. 4 includes data for aged catalysts of the comparative example and examples 2, 8 and 9 and demonstrates the effect of loading of Neodymium on $N_2O$ selectivity. As shown in FIG. 4, the presence of Neodymium leads to improved $N_2O$ selectivity at low and high temperatures.

FIG. 5 includes data for aged catalysts of the comparative example and examples 3, 10 and 11 and demonstrates the effect of loading of Niobium on NOx performance. As shown in FIG. 5, increase in loading of Niobium leads to improved low temperature NOx performance but not as significantly as with loading of Cerium or Neodymium. Increasing Niobium loading decreases the high temperature NOx conversion with the exception of example 3 which has improved high temperature NOx conversion compared to the copper small-pore zeolite in its acid form. As discussed above, example 3 is a substituted copper small-pore zeolite comprising 400 g/ft³ of niobium.

FIG. 6 includes data for aged catalysts of the comparative example and examples 3, 10 and 11 and demonstrates the effect of loading of Niobium on NOx performance. As shown in FIG. 6, the presence of Niobium leads to improved $N_2O$ selectivity at low and high temperatures.

FIG. 7 includes data for aged catalysts of the comparative example and examples 4 and 5 As shown in FIG. 7, the combination of Lanthanum and Niobium leads to improved low temperature NOx performance and similar high temperature NOx performance compared to the copper small-pore zeolite in its acid form. The combination of Lanthanum and Niobium leads to improved low temperature NOx performance and similar high temperature NOx performance compared to loading the small-pore zeolite with Niobium alone, as shown by comparing FIG. 7 to FIG. 6. FIG. 7 also shows that similarly the combination of Cerium and Niobium leads to improved low temperature NOx performance and similar high temperature performance compared to loading the small-pore zeolite with Niobium alone, as shown by comparing FIG. 7 to FIG. 6.

FIG. 8 includes data for aged catalysts of the comparative example and examples 4 and 5. As shown in FIG. 8, the combination of Lanthanum and Niobium leads to similar $N_2O$ selectivity at temperatures up to 250° C. and improved $N_2O$ selectivity at temperatures greater than 250° C. compared to the copper small-pore zeolite in its acid form. Similarly, the combination of cerium and niobium leads to similar $N_2O$ selectivity at temperatures up to 250° C. and improved $N_2O$ selectivity at temperatures greater than 250° C. compared to the copper small-pore zeolite in its acid form.

FIG. 9 includes data for aged catalysts of examples 12, 13, 14 and 15. FIG. 9 demonstrates the effect of combining Cerium and Neodymium and the loading of each on NOx performance. As shown in FIG. 9, loading with both Cerium and Neodymium compared to loading the small-pore zeolite with Cerium alone or Neodymium alone leads to improved low temperature NOx performance. This improvement is demonstrated for the combination of Cerium and Neodymium at both loadings — Example 13 having 100 g/ft³ Ce and 150 g/ft³ Nd and Example 14 having 125 g/ft³ Ce and 75 g/ft³ Nd loading with both Cerium and Neodymium also leads to improved high temperature NOx performance compared to the copper small-pore zeolite only substituted with cerium.

FIG. 10 includes data for aged catalysts of examples 12, 13, 14 and 15. FIG. 10 demonstrates the effect of combining Cerium and Neodymium and the loading of each on $N_2O$ selectivity. As shown in FIG. 10, loading with both Cerium and Neodymium compared to loading the small-pore zeolite with Cerium alone leads to improved low temperature $N_2O$ selectivity at both high and low temperatures. This improvement is demonstrated for the combination of Cerium and Neodymium at both loadings — Example 13 having 100 gift' Ce and 150 g/ft³ Nd and Example 14 having 125 gift' Ce and 75 gift' Nd.

FIG. 11 includes data for aged catalysts of the comparative example and examples 1 to 5. As shown in FIG. 11, the presence of Ce and La in the copper-substituted small-pore zeolite provides improved low temperature NOx activity compared to the copper small-pore zeolite in its acid form. The presence of Nb in addition to Ce or La does not significantly compromise the improved low temperature performance.

Therefore, from the data in Tables 1 to 3 and FIGS. 1 to 11, it can be seen that, especially for aged catalysts, the presence of Ce and/or La in a catalytic composition improves low temperature NOx conversion. The addition of Nb and/or Nd does not compromise the improved low temperature performance but improves the high temperature performance compared to a composition where just Ce and/or La are added. For example, the combination of Ce and Nd leads to improved low temperature NOx performance compared to loading the zeolite with Ce or Nd alone. The combination of Ce and Nd also leads to improved high temperature NOx performance and improved $N_2O$ selectivity compared to loading the zeolite with Ce alone.

Although the term "comprising" has been used to describe the composition of the catalyst to allow for the presence of other components, it will be appreciated that in some aspects the composition consists substantially of those components described herein, that is it contains less than 5 wt % other components, and in some aspects less than 1% other components and in some aspects no other components.

All references to wt % herein are relative to the total weight of the copper-substituted small-pore zeolite unless otherwise indicated.

The invention claimed is:

1. A catalytic composition for treating a NOx-containing exhaust gas, wherein the composition comprises a copper-substituted small-pore zeolite comprising:
   i) Ce and/or La in a total amount of about 5 to about 400 g/ft³; and
   ii) Nd and/or Nb in a total amount of about 5 to about 400 g/ft³.

2. The catalytic composition of claim 1, wherein the copper is present in an amount of from about 1 to about 6 wt %.

3. The catalytic composition of claim 1, wherein the copper is present in an amount of about 3 to about 5.5 wt %.

4. The catalytic composition of claim 1, wherein the copper is present in an amount of about 4 wt %.

5. The catalytic composition of claim 1, wherein the small-pore zeolite has a CHA or AEI framework structure type.

6. The catalytic composition of claim 1, wherein the zeolite has a silica to alumina molar ratio of less than 30.

7. The catalytic composition of claim 1, wherein the zeolite has a silica to alumina molar ratio of about 5 to about 30.

8. The catalytic composition of claim 1, wherein the zeolite has a silica to alumina molar ratio of about 10 to about 30.

9. The catalytic composition according to claim 1, wherein Ce and/or La are present in a total amount of about 50 to about 200 g/ft³.

10. The catalytic composition according to claim 1, wherein Nd and/or Nb are present in a total amount of about 50 to about 200 g/ft³.

11. The catalytic of claim 1, wherein the composition comprises:
   Copper in an amount of from about 1 to about 6 wt % of the catalytic composition;
   Ce and/or La in a total amount of about 5 to about 400 g/ft³; and
   Nd and/or Nb in a total amount of about 5 to about 400 g/ft³.

12. A catalyst article for an exhaust gas system, the catalyst article comprising the catalytic composition according to claim 1 and a substrate.

13. An exhaust gas system comprising the catalyst article of claim 12 and a combustion engine.